(12) United States Patent
Morita et al.

(10) Patent No.: US 6,561,785 B1
(45) Date of Patent: May 13, 2003

(54) MOLD CLAMPING APPARATUS HAVING BALLSCREW DIRECTLY CONNECTED TO ROTOR OF SERVO MOTOR

(75) Inventors: Ryozo Morita, Nagoya (JP); Takashi Shinoda, Aichi-ken (JP); Keijiro Oka, Nagoya (JP)

(73) Assignee: Kabushiki Kaisha Meiki Seisakusho, Nagoya (JP)

(*) Notice: Subject to any disclaimer, the term of this patent is extended or adjusted under 35 U.S.C. 154(b) by 282 days.

(21) Appl. No.: 09/694,193

(22) Filed: Oct. 23, 2000

(30) Foreign Application Priority Data

Oct. 25, 1999 (JP) ............................. 11-302041
Sep. 27, 2000 (JP) ....................... 2000-294132

(51) Int. Cl.[7] ............................................... B29C 45/66
(52) U.S. Cl. ..................... 425/150; 425/451.7; 425/589
(58) Field of Search .............................. 425/150, 451.7, 425/451.9, 589, 595

(56) References Cited

U.S. PATENT DOCUMENTS

| 4,984,980 A | * | 1/1991 | Ueno ......................... 425/595 |
| 5,378,141 A | * | 1/1995 | Aoki ........................... 425/589 |
| 5,861,118 A | * | 1/1999 | Hokino et al. ............. 425/150 |

FOREIGN PATENT DOCUMENTS

| JP | 1-36587 | 11/1989 |
| JP | 1-36588 | 11/1989 |

* cited by examiner

Primary Examiner—James P. Mackey
(74) Attorney, Agent, or Firm—Burr & Brown

(57) ABSTRACT

A mold clamping apparatus including a moving device for moving a movable plate relative to a stationary plate. The moving device includes (a) a plurality of ballscrew shafts each of which extends from the stationary plate toward the movable plate, and each of which is supported at an axis end portion thereof by the stationary plate, so as to be rotatable relative to the stationary plate and so as not to be displaceable relative to the stationary plate in an axial direction thereof; (b) a plurality of servo motors which drive the respective ballscrew shafts, and which are disposed on one of opposite sides of the movable plate remote from the stationary plate, each of the servo motors having a rotor which is connected to the other axial end portion of the corresponding one of the ballscrew shafts such that the rotor and the corresponding ballscrew shaft are rotatable together; and (c) a plurality of ballscrew nuts which engage the respective ballscrew shafts and are fixed to the movable plate, so as to be moved in the axial direction with rotations of the respective ballscrew shafts, for thereby carrying the movable plate in the axial direction.

11 Claims, 2 Drawing Sheets

MOLD CLAMPING APPARATUS HAVING BALLSCREW DIRECTLY CONNECTED TO ROTOR OF SERVO MOTOR

BACKGROUND OF THE INVENTION

1. Field of the Invention

The present invention relates in general to a molding clamping apparatus, and more particularly to such a molding clamping apparatus which includes a ballscrew shaft and a ballscrew nut, for moving a movable plate relative to a stationary plate, so as to open, close and clamp a mold consisting of movable and stationary mold halves that are to be fixed to the movable and stationary plates, respectively.

2. Discussion of Related Art

As an apparatus for clamping a mold used for an injection molding machine, a press forming machine or other forming machine, for example, there is known a mold clamping apparatus equipped with a hydraulic cylinder which directly transmits a driving force to the movable plate, or which indirectly transmits the driving force to the movable plate through a toggle link mechanism. There is also known a mold clamping apparatus equipped with a pair or pairs of ballscrew shaft and ballscrew nut which serves to convert a rotational driving force to a reciprocal driving force and then transmit the reciprocal driving force to the movable plate.

As examples of the mold clamping apparatus equipped with the ballscrew shafts and nuts, JP-Y2-01-36587 and JP-Y2-01-36588 disclose apparatuses, in each of which four tie bars are provided to extend between the stationary and movable plates and have respective external threads formed in their outer circumferential surfaces, so as to serve the ballscrew shafts. The external threads of the four tie bars engage respective four internally-threaded ballscrew nuts which are attached to the movable plate. In the apparatus disclosed in JP-Y2-01-36587, the four tie bar are adapted to be rotatable about their respective axes in the forward and reverse directions, while the four ballscrew nuts are fixed to the movable plate so as to be not rotatable relative to the movable plate, so that the four ballscrew nuts are axially moved with rotations of the four tie bars which are driven by an electric motor, whereby the movable plate carried by the four ballscrew nuts are moved toward and away from the stationary plate. In the apparatus disclosed in JP-Y2-01-36588, the four ballscrew nuts are supported by the movable plate rotatably relative to the movable plate, and are driven by an electric motor so as to be rotated, so that the four ballscrew nuts are axially moved, whereby the movable plate carried by the four ballscrew nuts are moved toward and away from the stationary plate.

Owing to the construction in which the four tie bars extending between the movable and stationary plates serve as the ballscrew shafts, each of the above-described apparatuses advantageously has smaller total length and size than those of an apparatus in which the ballscrew shafts are disposed in one of opposite sides of the movable plate remote from the stationary plate. However, the above-described apparatuses, in which the rotational driving force generated by the electric motor is transmitted to the tie bars or the ballscrew nuts through gears, suffer from the problem that the gears meshing with each other generate large noises. This problem of the noises might be somewhat resolved by employing a timing belts or other belts in place of the gears. However, the belts produces particles or dusts as the belts are worn, and the produced particles or dusts problematically contaminate the formed product and the environment.

In the apparatus disclosed in JP-Y2-01-36588, each tie bar is fixed, at one of axially opposite end portions thereof remote from the stationary plate, to an end plate (designated by the reference numeral 14 in FIG. 1 of the publication) which is disposed movably in the axial direction of the tie bars, so that the end plate is moved when the tie bars are elongated by a reaction force of a mold clamping force (compressive force) which is generated by and between the movable and stationary plates in an operation for closing the mold. That is, the end plate is displaced by a distance corresponding to an amount of the elongation of the tie bars, whereby the servo motor is protected from application of an excessively large load thereto due to the elongation of the tie bars, or whereby a load applied to the servo motor is reduced when the tie bar is elongated. However, the arrangement enabling the displacement of the end plate requires a complicated structure, thereby inevitably complicating even the construction of the entirety of the apparatus.

In view of the above-described problems, the present applicant has proposed a mold clamping apparatus in Japanese Patent Application No. 11-211600. In the proposed apparatus, each of the ballscrew shafts is fixed at an axial end portion thereof to the movable plate, and extends from the movable plate toward the stationary plate so as to pass through the stationary plate, such that the other axial end portion of each ballscrew shaft projects from one of opposite side faces of the stationary plate remote from the movable plate, over a predetermined distance. The servo motors are fixed to the corresponding portions of the one of the opposite side faces of the stationary plate, from which the other axial end portion of each ballscrew shaft projects. Each ballscrew shaft engages, at the other axial end portion projecting from stationary plate, the corresponding one of the ballscrew nuts which are directly fixed to the rotors of the respective servo motors.

This proposed mold clamping apparatus, in which the ballscrew nuts are fixed directly to the rotors of the respective servo motors, no longer suffers from the above-described problem encountered in the conventional apparatus in which the rotational driving force generated by the servo motor is transmitted to the ballscrew shafts and nuts via the gears or belts. That is, the proposed mold clamping apparatus suffers from neither noises generated by the mutually meshing gears, nor dusts produced due to wear of the belts.

However, in the proposed mold clamping apparatus, in which the ballscrew nuts are fixed to the rotors of the respective servo motors so as to be rotated together with the rotors, a relatively large rotational inertia acts on each servo motor, and an accordingly large load is applied to each servo motor, for example, upon initiation and termination of rotation of the servo motor, thereby causing some delay of each change in the momentum of the movable plate during an operation for opening and closing the mold, and increasing a time required for actual initiation or termination of the motion of the movable plate in response to a command inputted by the operator for initiating or terminating the motion of the movable plate. In this respect, the proposed mold clamping apparatus has a difficulty in performing an operation in which the product is required to be formed in a short time.

Further, in the proposed mold clamping apparatus, the servo motors are attached to the one of opposite side faces of the stationary plate remote from the movable plate, and the ballscrew shafts extends from the movable plate toward the stationary plate so as to pass through the stationary plate, as described above. In this arrangement, the above-described other axial end portion of each ballscrew shaft further projects from the stationary plate in a direction away from the movable plate, as the movable plate is moved toward the stationary plate. This arrangement deteriorates the condition of the operator's operation, reducing the efficiency of the operation. For example, where this mold clamping apparatus is used for an injection molding machine, the projecting axially end portions of the ballscrew shafts, as well as the servo motors attached to the side face of the stationary plate, disturb various operations which should be carried out on the side of the stationary plate remote from the movable plate, such as an operation for removing a purging resin from a nozzle of the injection molding machine which is located on the side of the stationary plate remote from the movable plate.

Thus, even the apparatuses having the excellent features should be further improved to overcome the drawbacks addressed above.

SUMMARY OF THE INVENTION

It is therefore a principal object of the present invention to provide a mold clamping apparatus having an improved construction which prevents generation of noises and production of dusts during operation of the apparatus, and which reduces a rotational inertia acting on each servo motor that generates the driving force for opening, closing and clamping the mold, and accordingly reduces a load applied to the servo motor upon initiation and termination of rotation of the servo motor, so as to shorten the time required for forming the product.

It is a first optional object of the invention to provide a mold clamping apparatus having a novel construction in which the servo motors and the ballscrew shafts are disposed in a manner that facilitates the operator's operation on a machine incorporating the mold clamping apparatus, and also other operations required for forming a desired product.

It is a second optional object of the invention to provide a mold clamping apparatus which is simple in construction and is capable of preventing application of an excessively large load to the servo motors when the ballscrew shafts are elongated by a reaction force of a mold clamping force generated in an operation for closing the mold.

The above objects may be achieved according to the principle of the present invention, which provides a mold clamping apparatus for clamping a mold consisting of a stationary mold half and a movable mold half, the mold clamping apparatus comprising: a stationary plate to which the stationary mold half is to be fixed; a movable plate to which the movable mold half is to be fixed and which is disposed so as to be opposed to the stationary plate in a predetermined direction; and a moving device which moves the movable plate toward and away from the stationary plate in the predetermined direction, so as to close and open the mold, wherein the moving device comprises:

(a) a plurality of ballscrew shafts each of which extends in the predetermined direction from the stationary plate toward the movable plate, and each of which is supported at one of axially opposite end portions thereof by the stationary plate, so as to be rotatable relative to the stationary plate and so as not to be displaceable relative to the stationary plate in an axial direction thereof; (b) a plurality of servo motors which drive the respective ballscrew shafts, and which are disposed on one of opposite sides of the movable plate remote from the stationary plate, each of the servo motors having a rotor which is connected to the other of the axially opposite end portions of the corresponding one of the ballscrew shafts such that the rotor and the corresponding ballscrew shaft are rotatable together; and (c) a plurality of ballscrew nuts which engage the respective ballscrew shafts and are fixed to the movable plate, so as to be moved in the axial direction by rotations of the respective ballscrew shafts, for thereby moving the movable plate toward and away from the stationary plate in the axial direction.

In the mold clamping apparatus constructed according to the principle of the invention, the ballscrew shafts each having a diameter smaller than that of each of the ballscrew nuts are directly connected to the rotors of the respective servo motors such that each ballscrew shaft is rotatable in the forward and reverse directions, together with the rotor of the corresponding one of the servo motors. This construction provides a smaller rotational inertia acting on the rotor of each servo motor, than where the ballscrew nuts are directly connected to the rotors of the servo motors, and accordingly reduces a load applied to each servo motor upon initiation and termination of rotation of the servo motor, thereby shortening a time required for actual initiation or termination of the motion of the movable plate in response to a command inputted by the operator for initiating or terminating the motion of the movable plate during an operation for opening and closing the mold, resulting in a reduced time required for forming the product. Further, since the present mold clamping apparatus does not have gears, belts or any other members for transmitting a rotational driving force generated by each servo motor, to the ballscrew shaft or nut, it is possible to prevent generation of noises due to the mutually meshing gears and also production of dusts due to wear of the belts during operation of the apparatus.

In the present mold clamping apparatus, the servo motors are located on the side of the movable plate remote from the stationary plate, as described above. Thus, even where this mold clamping apparatus is used to be incorporated in an injection molding machine, for example, the servo motors do not disturb operations which should be carried out on the side of the stationary plate remote from the movable plate, such as an operation for taking out a purging resin from a nozzle of the injection molding machine which is located on the side of the stationary plate remote from the movable plate.

In the present mold clamping apparatus, the ballscrew shafts extend from the stationary plate toward the movable plate in parallel with the direction in which the movable plate is moved by the moving device, and each of the ballscrew shafts is supported at one of the axially opposite end portions by the stationary plate, so as not to be movable relative to the stationary plate in the axial direction. With rotation of the respective ballscrew shafts, the ballscrew nuts fixed to the movable plate are moved in the axial direction, for thereby moving the movable plate toward and away from the stationary plate in the axial direction. Thus, in contrast to a conventional apparatus, in which the ballscrew shafts are axially moved so as to move axially the movable plate so that the axial end portions of the respective ballscrew shafts project axially outwardly from the stationary plate, the ballscrew shafts do not have to be axially moved so as to axially move the movable plate, thereby not disturbing the operations which are carried out on the side of the stationary plate remote from the movable plate.

As is clear form the above description, the mold clamping apparatus of the present invention is capable of reduce the time required for forming the product while preventing generation of noises and production of dusts during operation of the apparatus. Thus, the present mold clamping apparatus can be used, for example, in an operation carried out in a clean room, an operation in which the product is required to be formed in a reduced time, and other kinds of operations for other purposes. Further, in the present mold clamping apparatus, the servo motors and the ballscrew shafts are disposed in a manner that facilitates the operator's operation on a machine incorporating the mold clamping apparatus, and also other operations required for forming a desired product. It is noted that the moving device, which moves the movable plate relative to the stationary plate, serves to generate a mold clamping force for clamping the mold when each ballscrew shaft is rotated in the direction making the movable plate move toward the stationary plate even after the stationary and movable mold halves have been brought into contact with each other. In this sense, the moving device may be also referred to as an clamping-force generating device.

According to a first preferred form of the mold clamping apparatus of the invention, the rotor has, at a center thereof, an axial hole in which the other of the axially opposite end portions of the ballscrew shaft is received, and wherein the rotor has an internal spline, and the ballscrew shaft has, in the other of the axially opposite end portions, an external spline which engages with the internal spline of the rotor for enabling the ballscrew shaft to rotate together with the rotor and permitting a sliding movement of the ballscrew shaft relative to the rotor in the axial direction.

In the first preferred form of the mold clamping apparatus of the invention, each of the ballscrew shafts and the rotor of the corresponding servo motor are reliably connected to each other with the ballscrew shaft and the rotor being rotatable together with each other, by simply engaging the external and internal splines each other.

The external and internal splines mate with each other for inhibiting rotation of the ballscrew shaft relative to the rotor, namely, inhibiting displacement of the ballscrew shaft relative to the rotor in the circumferential direction, but permitting sliding movement of the ballscrew shaft relative to the rotor in the axial direction, namely, permitting displacement of the ballscrew shaft relative to the rotor in the axial direction. Accordingly, the external spline formed in the ballscrew shaft is axially slidable relative to the internal spline formed in the rotor, when the ballscrew shaft is elongated by a reaction force of a mold clamping force (compressive force) generated by and between the movable and stationary plates in an operation for closing the mold. That is, the external spline is axially displaced by a distance corresponding to an amount of the elongation of the ballscrew shaft, whereby the servo motor is protected from application of an excessively large load thereto due to the elongation of the ballscrew shaft, or whereby a load applied to the servo motor is reduced when the ballscrew shaft is elongated.

According to one advantageous arrangement of the first preferred form of the invention, the internal spline consists of a plurality of projections or grooves formed in an inner circumferential surface of the axial hole of the rotor and circumferentially spaced apart from each other, and the external spline consists of a plurality of grooves or projections formed in an outer circumferential surface of the other of the axially opposite end portions of the ballscrew shaft and circumferentially spaced apart from each other, and wherein the axial hole has a bottom face which cooperates with an axial end face of the other of the axially opposite end portions of the ballscrew shaft to define an axial spacing for permitting displacement of the ballscrew shaft relative to the rotor in the axial direction while the internal spline and the external spline are held in meshing engagement with each other.

According to a second preferred form of the invention, the mold clamping apparatus further comprises a tubular covering member which is disposed between the stationary plate and the movable plate and which surrounds at least a threaded part of each of the ballscrew shafts which portion has a thread formed therein. The tubular covering member protects the thread of each ballscrew shaft from being damaged. For example, in an operation for mounting the mold halves onto the stationary and movable plates, the covering member prevents the thread from being damaged due to contact of the thread with the mold halves. Further, the covering member prevents splashing of oil, grease and other lubricants which are applied to the ballscrew shaft.

According to a third preferred form of the invention, the mold clamping apparatus further comprises an actual-rotary-position detecting device which detects an actual rotary position of the rotor of each of the servo motors, a target-rotary-position setting device which sets a target rotary position of the rotor of each of the servo motors which makes the movable plate parallel to the stationary plate, and a control device which controls the servo motors such that the detected rotary position of the rotor of each of the servo motors coincides with the set target rotary position of the rotor of each of the servo motors.

The arrangement according to this third preferred form of the invention assures a high degree of parallelism of the stationary plate with respect to the movable plate which is carried by the plurality of ballscrew nuts, namely, which receives, in respective portions thereof, forces that are applied from the respective ballscrew nuts and that force the movable plate toward the stationary plate. Thus, the stationary and movable mold halves attached to the respective stationary and movable plates can be constantly brought into close contact with each other over the entirety of each of their mutually opposed surfaces with high stability, thereby assuring high quality of the formed product without a risk of forming a defective product.

Where this mold clamping apparatus having the above advantageous feature is used to be incorporated in an injection molding machine, it is possible to advantageously practice an injection molding according to the so-called injection compression forming method, in which a molten resin is compressed by a predetermined amount of force after the molten resin has been injected into a mold cavity in the mold, since the stationary and movable mold halves cooperating with each other to constitute the mold can be constantly brought into close contact with each other over the entirety of each of their mutually opposed surfaces with high stability, as described above.

According to a fourth preferred form of the mold clamping apparatus of the invention, the actual-rotary-position detecting device includes a rotary encoder which is built in each of the servo motors. Since each ballscrew shaft is directly connected in its axial end portion to the rotor of the corresponding servo motor, it is possible to use the built-in type rotary encoder which is built in the servo motor. Thus, the mold clamping apparatus can be made more simple in construction and compact in size, than where the rotary encoder as the actual-rotary-position detecting device is provided independently of the servo motor.

According to a fifth preferred form of the mold clamping apparatus of the invention, at least one of the ballscrew shafts consists of a right-hand ballscrew shaft, while each of the other of the ballscrew shafts consists of a left-hand ballscrew shaft.

It is considered possible that the each ballscrew shaft might be partially deformed to be distorted or twisted in a direction of the rotation of the ballscrew nut, for example, due to friction acting between the ballscrew shaft and nut. In the mold clamping apparatus according to this fifth preferred form of the invention, when the ballscrew shafts are thus twisted, the right-hand ballscrew shaft and the left-hand ballscrew shaft are twisted in the respective directions opposite to each other, thereby preventing rotation of the movable plate or displacement of the movable plate in the circumferential direction relative to the stationary plate, due to the twisting deformations of the respective ballscrew shafts. Thus, the arrangement of the present fifth preferred form is effective to prevent undesirable offset of the movable mold half relative to the stationary mold half in the circumferential direction, assuring reliable positioning of the movable mold half with respect to the stationary mold half in a direction perpendicular to the axial direction of the ballscrew shafts.

According to one advantageous arrangement of the fifth preferred form of the mold clamping apparatus of the invention, the ballscrew shafts consists of an even number of ballscrew shafts consisting of at least one pair of ballscrew shafts each of which consists of the right-hand ballscrew shaft and the left-hand ballscrew shaft.

According to a sixth preferred form of the invention, the mold clamping apparatus further comprises a guide way which extends in the predetermined direction and which supports the movable plate such that the movable plate is sidable on said guide way in the predetermined direction.

The arrangement of this sixth preferred form of the invention, as well as the above-described arrangement of the fifth preferred form, is effective to prevent undesirable offset of the movable mold half relative to the stationary mold half in the direction perpendicular to the axial direction, assuring reliable positioning of the movable mold half with respect to the stationary mold half with high accuracy.

According to a seventh preferred form of the invention, the mold clamping apparatus further comprises a load detecting device which detects amounts of loads acting between the respective ballscrew nuts and the movable plate when the mold is being clamped after the stationary and movable mold halves have been brought into contact with each other by the rotation of the respective ballscrew shafts, and an adjusting device which adjusts amounts of the rotations of the respective ballscrew shafts in a manner that equalizes the amounts of the loads detected by the load detecting device, to each other. The load detecting device may include a plurality of load cells which are interposed between the respective ballscrew nuts and the movable plate and which detect the amounts of loads acting between the respective ballscrew nuts and the movable plate.

In the seventh preferred form of the mold clamping apparatus of the invention, the adjusting device adjusts the amounts of the rotations of the respective ballscrew shafts, for example, by adjusting operating amounts of the respective servo motors which rotate the respective ballscrew shafts, such that the detected amounts of the loads are equalized to each other while the mold is being clamped. This arrangement makes it possible to equalize local forces which are applied to respective portions of the movable plate from the respective ballscrew nuts and which force the movable plate toward the stationary plate, so that a required clamping force consisting of the sum of the local forces is distributed evenly over the entirety of each of mutually opposed surfaces of the movable and stationary mold halves which are attached to the respective movable and stationary plates.

Accordingly, the movable and stationary mold halves are brought into mutually contact and forced toward each other with the clamping force being distributed evenly over the entirety of each of the mutually opposed surfaces of the mold halves. The even distribution of the clamping force prevents or minimizes undesirable appearance of molding fin or flash in a parting line portion of the product which is formed in the cavity defined by and between the movable and stationary mold halves. Further, in the seventh preferred form of the mold clamping apparatus, the mold opening and closing motions are carried out while the parallel relationship between the movable and stationary plates being well maintained, avoiding a risk of formation of scratch on the mutually opposed surfaces of the respective movable and stationary mold halves, thereby preventing the mold halves and the formed product from being damaged or broken during the mold opening and closing motions.

DESCRIPTION OF THE DRAWINGS

The above and other objects, features, advantages and technical and industrial significance of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
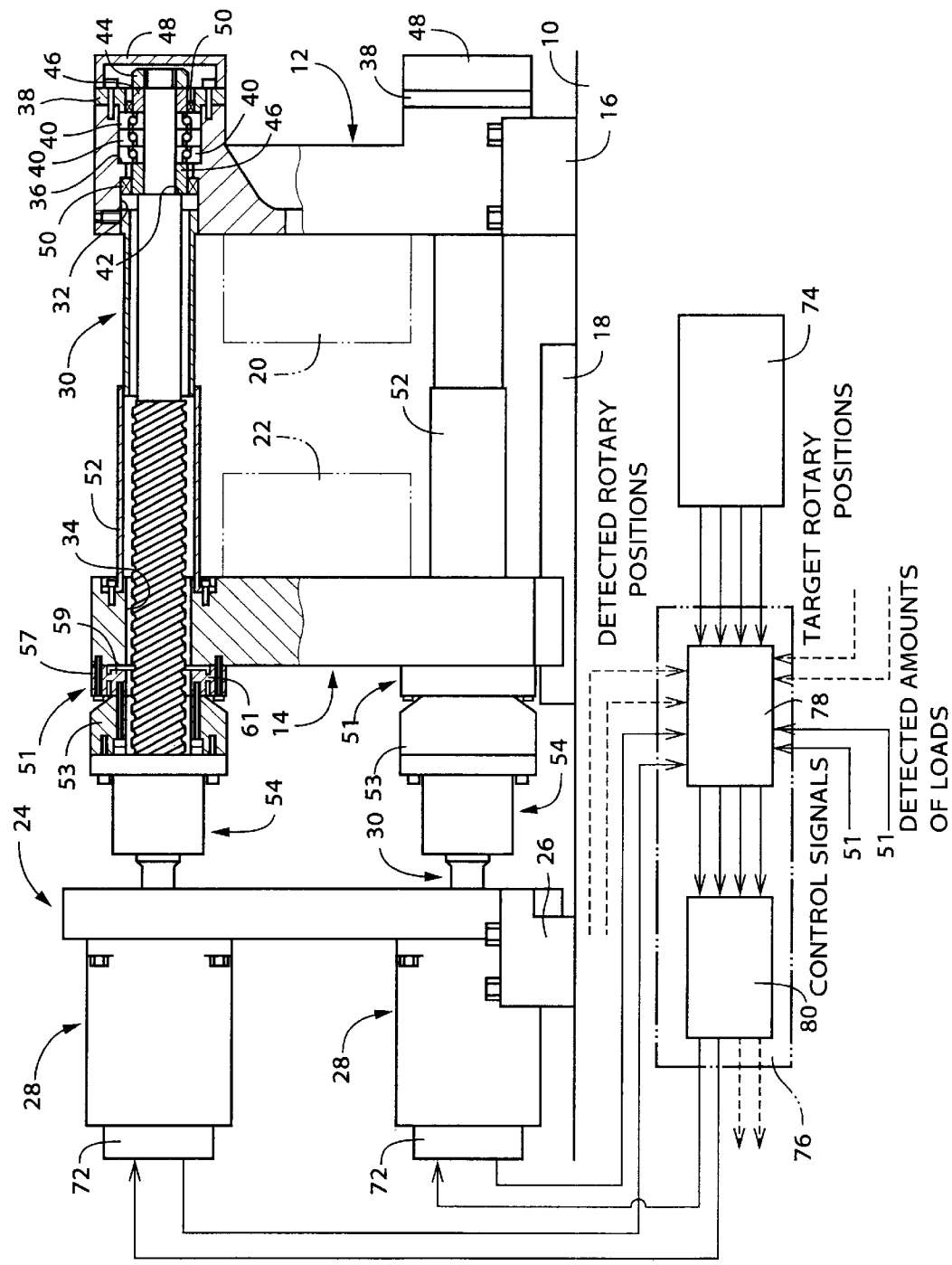
FIG. 1 is an elevational view in partly cross section for schematically showing a mold clamping apparatus according to one embodiment of the present invention.
Figure 2:
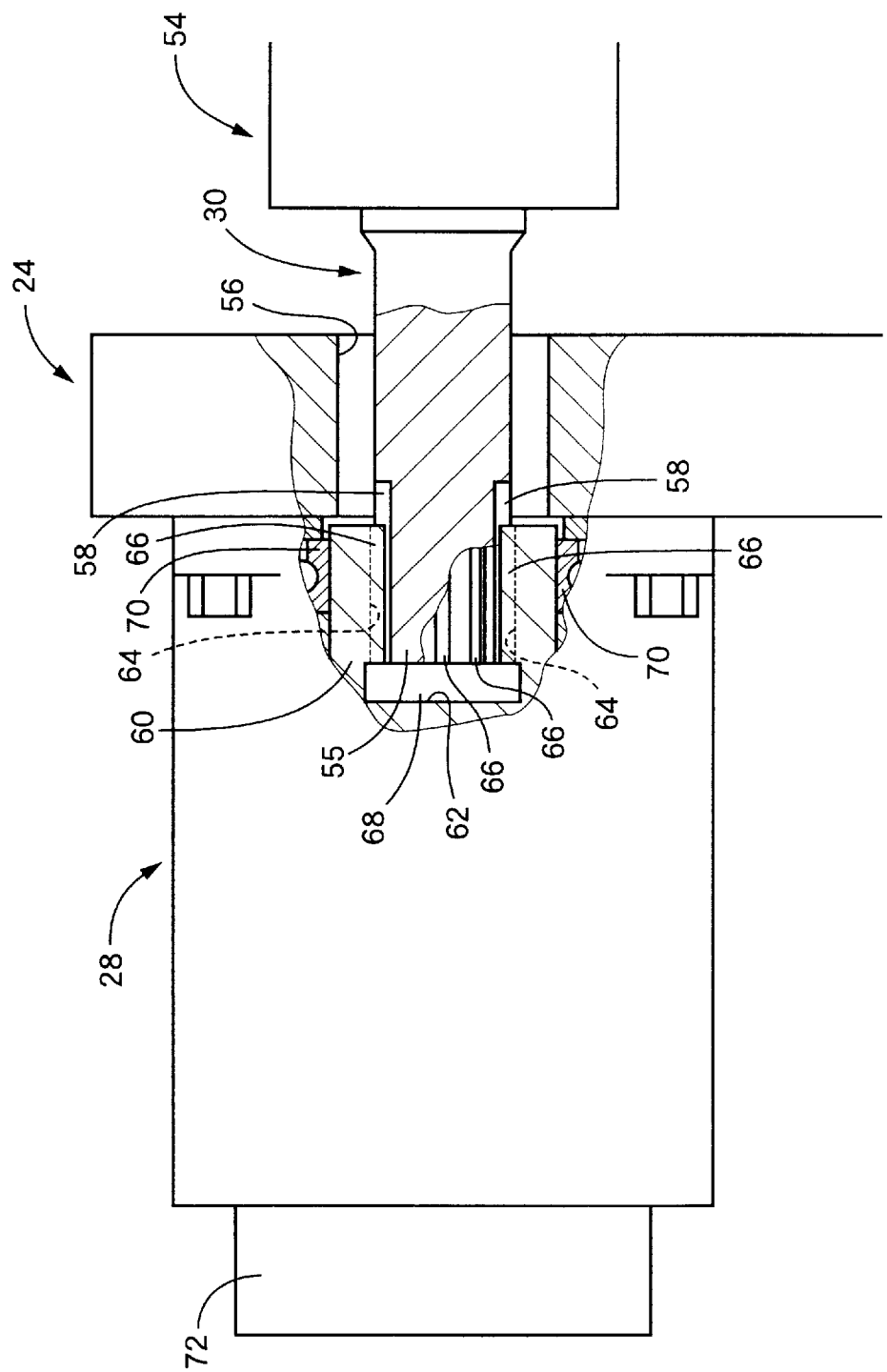
FIG. 2 is a view in partly cross section for showing an essential part of the mold clamping apparatus of FIG. 1, in which part a ballscrew shaft is connected to a rotor of a servo motor.

Referring to FIGS. 1 and 2, there will be described a mold clamping apparatus constructed according to one embodiment of this invention.

FIG. 1 is an elevational view schematically showing a mold clamping apparatus which is used to be incorporated in an injection molding machine and which includes a base 10, a stationary plate 12 and a movable plate 14. The stationary and movable plates 12, 14 are held by the base 10, and respectively consist of generally rectangular-shaped plates having respective sizes substantially equal to each other.

Described more specifically, the stationary plate 12 is fixedly bolted to a first bracket 16 which is formed integrally with the base 10. The movable plate 14 is disposed in one of opposite sides of the stationary plate 12 remote from the injection molding machine (not shown), namely, in the left side of the stationary plate 12 as viewed in FIG. 1. The movable plate 14 is opposed to the stationary plate 12 in the horizontal direction with a predetermined spacing therebetween, and is slidably held by a guide way in the form of a liner guide 18 consisting of an elongated projection which projects upwardly over a predetermined distance and which extends continuously in the horizontal direction over a predetermined distance. That is, the stationary plate 12 is fixed relative to the base 10, while the movable plate 14 is disposed on the base 10, movably toward and away from the stationary plate 12 in the horizontal direction, i.e., in the direction in which the plates 12, 14 are opposed to each other. The movable plate 14 is thus movable in the forward direction, i.e., in the direction toward the stationary plate 12, and also in the reverse direction, i.e., in the direction away from the stationary plate 12, thereby for closing and opening a mold consisting of a stationary mold half 20 and a movable mold half 22 which are represented by the respective two-dotted chain lines in FIG. 1.

On the base 10, there is a motor mounting plate 24 which is disposed on one of opposite sides of the movable plate 14 remote from the stationary plate 12 so as to be opposed to the movable plate 14 in the horizontal direction. The motor mounting plate 24 consists of a generally rectangular-shaped plate having a size substantially equal to that of the stationary and movable plates 12, 14, and is fixedly bolted to a second bracket 26 which is formed integrally with the base 10. Four servo motors 28 (two of them are invisible in FIG. 1) are fixed to respective four corners of one of opposite side faces of the motor mounting plate 24 remote from the movable plate 14.

Between the motor mounting plate 24 and the stationary plate 12, there are four ballscrew shafts 30 (two of them are invisible in FIG. 1) which are provided to extend in the horizontal direction so as to be parallel to each other. Each of the four ballscrew shafts 30 has a length enough to connect the stationary plate 12 and the motor mounting plate 24, and has an external thread formed in a part of its axially intermediate portion. Each ballscrew shaft 30 has axially opposite end portions, one of which passes through the corresponding one of four through-holes 32 formed in respective four corners of the stationary plate 12, and the other of which passes through the corresponding one of four through-holes 34 formed in respective four corners of the movable plate 14. The other axial end portion of each ballscrew shaft 30 projects towards the corresponding one of the above-described four corners of the motor mounting plate 24.

As is apparent from the above description, in the mold clamping apparatus of the present invention, the four ballscrew shafts 30 are provided to be positioned in the respective positions, in place of clamp shafts or tie bars which are traditionally employed to guide the movable plate that is movable toward and away from the stationary plate in a conventional mold clamping apparatus.

The four ballscrew shafts 30 consist of two pairs of ballscrew shafts 30, one of which is located the upper side of the other pair. One of the upper pair of ballscrew shafts 30 consists of a right-hand ballscrew shaft, while the other consists of a left-hand ballscrew shaft. Similarly, one of the lower pair of ballscrew shafts 30 consists of a right-hand ballscrew shaft, while the other consists of a left-hand ballscrew shaft. That is, in the one of the upper pair and the one of the lower pair of ballscrew shafts 30, the thread is formed to extend in a helical direction in which the thread axially advances away from one axial end toward the other axial end of the shaft 30 as the thread circumferentially advances clockwise as seen from the side of the one axial end. In the other of the upper pair and the other of the lower pair of ballscrew shafts 30, the thread is formed to extend in a helical direction in which the thread axially advances away from one axial end toward the other axial end of the shaft 30 as the thread circumferentially advances counter-clockwise as seen from the side of the one axial end.

A plurality of bearings 40 are provided to be fitted in each of the through-holes 32 which are formed in the respective four corners of the stationary plate 12. The above-described one of the axially opposite end portions of each ballscrew shaft 30 is fitted in the bearings 40, so as not to be displaceable relative to the bearings 40 in the axial direction. The bearings 40 are gripped, at their respective radially outer potions, by and between a shoulder portion 36 of the inner circumferential surface of the through-hole 32, and a bearing retainer ring 38 attached to the opening of the through-hole 32 with suitable screws, so that the bearings 40 are fixed in the through-hole 32. Further, the bearings 40 are gripped, at their respective radially inner portions, by and between two bearing collars 46 which are fitted on the one of the axially opposite end portions of the ballscrew shaft 30 so as not to be displaceable relative to the ballscrew shaft 30. It is noted that one of the two bearing collars 46 is brought in contact with a shoulder portion 42 of the outer circumferential surface of the ballscrew shaft 30, and that the other of the two bearing collars 46 is brought in contact with a fastening nut 44 which is screwed in an externally-threaded axial end part of the one of the axially opposite end portions of the ballscrew shaft 30.

As is clear from the above description, the four ballscrew shafts 30 extend, in parallel to the direction in which the movable plate 14 is to be moved, from the stationary plate 12 toward the movable plate 14, and pass through the movable plate 14 so as to project from the movable plate 14 toward the motor mounting plate 24. Each of the ballscrew shafts 30 is supported at the above-described one of the axially opposite end portions by the stationary plate 12, rotatably about the axis in the forward and reverse directions but not movably in the axial direction. Since each ballscrew shaft 30 is supported at the axial end portion by the stationary plate 12 through the bearings 40 which are radially interposed between the inner circumferential surface of the through-hole 32 and the outer circumferential surface of the axial end portion of the ballscrew shaft 30, the bearings 40 serve to receive a force which acts on the ballscrew shaft 30 in the axial direction when the movable plate 14 is moved in the forward direction, i.e., in the direction toward the stationary plate 12. In FIG. 1, the reference numeral 48 designates a nut covering member for covering the fastening nut 44 which is rotatable together with the ballscrew shaft 30, while the reference numerals 50, 50 designate oil seals for preventing leakage of an oil which is filled in the through-hole 32 for lubricating the bearings 40.

Between the stationary and movable plates 12, 14, there are provided four telescopic-type ballscrew shaft protective covering members 52, each of which is mounted on the axially intermediate portion of the corresponding ballscrew shaft 30 so as to cover the axially intermediate portion of the ballscrew shaft 30. Each of the four telescopic-type ballscrew shaft protective covering member 52 consists of a large-diameter tubular member which covers a half of the intermediate portion of the ballscrew shaft 30, and a small-diameter tubular member which covers another half of the intermediate portion of the ballscrew shaft 30 and which is partially fitted in the large-diameter tubular member so as to be connected to the large-diameter tubular member. The large-diameter tubular member is held in slidably contact at an inner circumferential surface thereof with an outer circumferential surface of the small-diameter tubular member, so that the covering member 52 expands and contracts in the axial direction as the large- and small-diameter tubular members are axially moved relative to each other. The covering member 52 is fixed, at its axially opposite end portions, i.e., at axial end portions of the respective large- and small-diameter tubular members which portions are opposite to portions at that the two tubular members are connected to each other, to the respective stationary and movable plates 12, 14 by suitable screws. Thus, as the movable plate 14 is moved in the reverse and forward directions, the covering member 52 expands and contracts in the axial direction, thereby varying the entire length of the covering member 52, whereby the intermediate portion, particularly, the threaded part of the ballscrew shaft 30 is protected by the covering member 52, irrespective of the position of the movable plate 30.

The above-described four servo motors 28 and the four ballscrew shafts 30 cooperate with four ballscrew nuts 54 to constitute a moving device for moving the movable plate 14 toward and away from the stationary plate 12. Each of the four ballscrew nuts 54 engages the above-described other axial end portion of the corresponding ballscrew shaft 30 which portion projects from the movable plate 14 toward the motor mounting plate 24. A tubular member 53 having a relatively large thickness is provided to be fixedly bolted to a peripheral portion of one of opposite side faces of each ballscrew nut 54 which one is closer to the movable plate 14, so as to be movable together with the ballscrew nut 54. The tubular member 53 is positioned radially outwardly of each ballscrew shaft 30, and extends from each ballscrew nut 54 toward the movable plate 14 over a predetermined distance.

Four load cells 51 each having a generally annular shape are provided to be bolted to one of opposite side faces of the movable plate 14 which one is close to the ballscrew nuts 54 and which one is remote from the stationary plate 12, so as to be positioned radially outwardly of the respective ballscrew shafts 30. Each of the four load cells 51 has a known construction, and includes an outer annular portion 57, an inner annular portion 59 which has a coaxial relation with the outer annular portion 57, a diaphragm like connecting portion 61 which has a generally thin-walled, annular shape and which is radially interposed between the outer and inner annular portions 57, 59 so as to connect the annular portions 57, 59, and a distortion gage which is bonded to the connecting portion 61. Each load cell 51 is bolted at the outer annular portion 57 to the side face of the movable plate 14 remote from the stationary plate 12, with the inner annular portion 59 being axyally spaced apart from the side face of the movable plate 12 by a small axial distance. Each load cell 51 is held in contact at the inner annular portion 59 with the tubular member 53 which is movable together with the ballscrew nut 54, and is bolted at the inner annular portion 59 to the tubular member 53.

As is clear from the above description, each ballscrew nut 54 is fixed to the side face of the movable plate 14 remote from the stationary plate 12, through the tubular member 53 and the load cell 51 which are interposed between the ballscrew nut 54 and the movable plate 14. In this arrangement, the ballscrew nut 54 is allowed to be displaced toward the movable plate 14 by an axial distance corresponding to the above-described small axial distance, while the ballscrew nut 54 carries the movable plate 14 toward and away from the stationary plate 12. Each load cell 51 serves to detect an amount of force applied from the corresponding ballscrew nut 54 for forcing the movable plate 14 toward the stationary plate 12 during the movement of the movable plate 14 toward the stationary plate 12. Namely, each load cell 51 detects the amount of the force as a load acting between the corresponding ballscrew nut 51 and the movable plate 14, on the basis of an amount of the displacement of the ballscrew nut 54 toward the movable plate 14. An output electric signal representing the detected amount of the load is supplied from the load cell 51 to a control device 76, which will be more specifically described below. Since each ballscrew nut 54 engaging the corresponding ballscrew shaft 30 is fixed to the side face of the movable plate 14 remote from the stationary plate 12, the ballscrew nut 54 serves to receive a force which acts on the ballscrew shaft 30 in the axial direction when the movable plate 14 is moved in the reverse direction, i.e., in the direction away from the stationary plate 12.

Each ballscrew shaft 30 has, in the above-described other axial end portion which projects from the movable plate 14 toward the motor mounting plate 24, an axially distal end part 55 which passes through the corresponding one of four through-holes 56 formed in respective four corners of the motor mounting plate 24 and which is coaxially introduced into the corresponding one of servo motors 28. To this end, each ballscrew shaft 30 and the corresponding servo motor 28 are positioned relative to each other, so as to have a coaxial relationship. In the axially distal end part 55 of the ballscrew shaft 30, there is provided an external spline in the form of a plurality of grooves 58 which are formed in the outer circumferential surface of the axially distal end part 55 so as to have a predetermined radial depth. The grooves 58 continuously extend in the axial direction of the ballscrew shaft 30 and equally spaced apart from each other in the circumferential direction of the ballscrew shaft 30.

Each servo motor 28, which receives the axially distal end part 55 of the corresponding ballscrew shaft 30, includes a is rotor 60 having a round hole 62 at a center thereof. The round hole 62 has an inside diameter slightly larger than an outside diameter of the axially distal end part 55 of the ballscrew shaft 30, and an axial depth larger than an axial length of the introduced part of the axially distal end part 55 of the ballscrew shaft 30. The rotor 60 has an internal spline in the form of the same number of projections 66 as that of the grooves 58 which are formed in the outer circumferential surface of the of the axially distal end part 55 of the ballscrew shaft 30. The projections 66 are formed in the inner circumferential surface of the round hole 62, by forming a plurality of grooves 64 in the inner circumferential surface of the round hole 62. Each of the grooves 64 is formed to continuously extends in the axial direction of the rotor 60, and has predetermined radial depth and circumferential width which permit fitting of a projection of the axially distal end part 55 of the ballscrew shaft 30, into the groove 64, wherein the projection is circumferentially defined by each adjacent two of the grooves 58 which are formed in the axially distal end part 55 of the ballscrew shaft 30. The projections 66 of the rotor 60 are fitted into the respective grooves 58 of the axially distal end part 55 of the ballscrew shaft 30. In this arrangement, the ballscrew shaft 30 is rotatable together with the rotor 60 of the servo motor 28, owing to engagement of circumferential end faces of each projection 66 and the corresponding groove 58.

It is noted that each projection 66 has predetermined radial depth and circumferential width which are slightly smaller than those of the groove 58, for thereby permitting sliding movement of the projection 66 which is fitted in the groove 58, relative to the groove 58 in the axial direction. Since the axial depth of the round hole 62 is larger than the axial length of the introduced part of the axially distal end part 55 of each ballscrew shaft 30, there is provided an axial spacing 68 between a bottom face of the round hole 62 and an end face of the axially distal end part 55 which are opposed to each other in the axial direction. That is, each projection 66 is displaceable relative to the corresponding to the groove 58 in the axial direction by an axial distance corresponding to an axial length of the axial spacing 68. In FIG. 2, the reference numerals 70, 70 designate bearings for supporting the rotor 60 such that the rotor 60 is rotatable relative to a body of the servo motor 28.

As is clear from the above description, with forward and reverse rotations of the respective ballscrew shafts 30 which are directly driven by the respective servo motors 28, the movable plate 14 is carried by the ballscrew nuts 54 which engage the respective ballscrew shafts 30, forward and backward, i.e., toward and away from the stationary plate 12 in the axial direction of the ballscrew shafts 30. With the forward and backward movements of the movable plate 14, the movable mold half 22 is moved toward and away from the stationary mold half 20, whereby the mold consisting of the stationary and movable mold halves 20, 22 is closed and opened. After the mold has been closed, namely, after the mold halves 20, 22 have been brought into contact with other, a clamping force for clamping the mold is generated with further rotations of the ballscrew shafts 30 in the respective directions which make the movable mold half 22 move toward the stationary mold half 20. In this instance, the mold halves 20, 22 are forced toward each other by the generated clamping force. It is noted that the backward movement of the movable plate 14 is limited by abutting contact of the movable plate 14 with a stopper (not shown) which is provided to project from the motor mounting plate 24 toward the movable plate 14.

In a conventional mold clamping apparatus, the stationary and movable plates are not necessarily parallel with respect to each other when the mold is closed, due to own weights of the stationary and movable mold halves attached to the stationary and movable plates, dimensional errors of the stationary and movable mold halves, or other factor. In the mold clamping apparatus of the present invention, a rotary adjustment system for adjusting rotations of the respective four servo motors 28 independently of each other, so as to assure parallelism of the stationary and movable plates with respect to each other.

The rotary adjustment system includes four rotary encoders 72 (two of them are invisible in FIG. 1) as an actual-rotary-position detecting device, a target setter 74 as a target-rotary-position determining device, and a control device 76. Each of the four rotary encoders 72 has a known construction, and is built in the corresponding one of the four servo motors 28. Each rotary encoder 72 detects an actual rotary position of the rotor 60 of the corresponding servo motor 28, and then outputs an electric signal representing the detected rotary position. The target setter 74 consists of a device including an input portion into which a determined target rotary position or changed target rotary position of each rotor 60 is put by an external operation with a keyboard or switching element, and an output portion from which an electric signal representing the target rotary position of each rotor 60 is supplied to the control device 76. The control device 76 includes a compare portion 78 and a control portion 80. The compare portion 78 is assigned to compare the detected rotary position of each rotor 60 with the target rotary position of each rotor 60, and then output a control signal which is prepared on the basis of the difference between the detected and target rotary positions of each rotor 60. The control portion 80 is assigned to control rotations of the respective servo motors 28 independently of each other, on the basis of the control signals supplied form the compare portion 78.

There will be described a process of adjusting the rotations of the four servo motors 28 with the above-described rotary adjustment system.

The process is initiated with a reference-rotary-position determining step of determining reference rotary positions of the rotors 60 of the respective servo motors 28. The step is implemented by moving the movable plate 14 toward the stationary plate 12 at a low feed rate with a jog mode or other manual mode until the stationary and movable mold halves 20, 22 which are attached to the stationary and movable plates 12, 14 are brought into contact with each other, namely, until the mold is closed. After the mold has been closed, the position of the movable plate 14 relative to the stationary plate 12 is finely adjusted so as to obtain a parallelism of the movable plate 14 with respect to the stationary plate 12. In this step, the rotary positions of the rotors 60 of the respective servo motors 28 which provide such a parallelism are determined as reference rotary positions of the rotors 60 of the respective servo motors 28.

The reference-rotary-position determining step is followed by a target-rotary-position setting step. In this step, such reference rotary positions of the rotors 60 of the respective servo motors 28, which make the movable plate 14 parallel with respect to the stationary plate 12 while at the same time bringing the movable mold half 22 in contact with the stationary mold half 20 so as to close the mold, are taken as the target rotary positions of the rotors 60 of the respective servo motors 28, so as to be put into the target setter 74. It is noted that the target rotary positions may be changed each time the mold is replaced with other mold. To this end, for example, the sum of the heights of the stationary and movable mold halves 20, 22 (as measured in the direction in which the movable mold half 20 is moved relative to the stationary mold half 22) may be put into the target setter 74, so that the target rotary positions can be changed when the stationary and movable mold halves 20, 22 are replaced with other stationary and movable mold halves. In this instance, the target rotary positions are changed on the basis of the differences between the sum of the heights of the stationary and movable mold halves 20, 22 and the sum of the heights of the other stationary and movable mold halves.

The target-rotary-position setting step is followed by a rotary-position controlling step in which the servo motors 28 are controlled by the control device 76 such that the detected rotary positions of the rotors 60 of the respective servo motors 28 coincide with the target rotary positions of the rotors 60 of the respective servo motors 28. Described more specifically, in this step, data representing the target rotary positions, which have been set by the target setter 74 in the target-rotary-position setting step, and data representing the detected rotary positions detected by the respective rotary encoders 72 are put into the compare portion 78 of the control device 76. In the compare portion 78, each of the detected rotary positions is compared with the corresponding one of the target rotary positions, for calculating an amount of the difference between each detected rotary position and the corresponding target rotary position. The compare portion 78 generates control signals each corresponding to the amount of the difference between the detected and target rotary positions, and the generated control signal are supplied to the control portion 80. The control portion 80 controls the rotations of the four servo motors 28 on the basis the control signals supplied from the compare portion 78, such that the detected rotary positions coincide with the respective target rotary positions, whereby the movable plate 14 is positioned to be parallel with respect to the stationary plate 12, with the movable mold half 22 being held in contact with the stationary mold half 20.

In the present mold clamping apparatus, the servo motors 28 can be controlled by the control device 76 also on the basis of the amounts of the loads detected by the four load cells 51 which are interposed between the respective ballscrew nuts 54 and the movable plate 14, when the mold is being clamped after the mold have been closed.

During a clamping operation in which the stationary and movable plates 12, 14 are forced toward each other by a predetermined clamping force, the movable plate 14 is forced toward the stationary plate 12 by local forces which are applied from the respective ballscrew nuts 54 and which cooperate with each other to constitute the predetermined clamping force. Amounts of these local forces applied from the respective ballscrew nuts 54 to the movable plate 14 are detected by the respective load cells 51. That is, the load cells 51 detect the amount of the local forces as amounts of the loads acting between the respective ballscrew nuts 54 and the movable plate 14. The detected amounts of the loads are supplied from the load cells 51 to the compare portion 78 of the control device 76, so that the detected amounts of the loads are compared with each other in the compare portion 78. The compare portion 78 generates control signals representing differences between the detected amounts of the loads, and then supplies the control signals to the control portion 80. The control portion 80 controls the servo motors 28 on the basis of the control signals supplied from the compare portion 78. Namely, the control portion 80 adjusts operating amounts of the respective servo motors 28 such that the above-described differences are compensated, or such that the amounts of the local forces applied from the respective four ballscrew nuts 54 to the movable plate 14 are equalized to each other. In this control of the servo motors 28 on the basis of the load detecting device in the form of the load cells 51, the control device 76 corresponds to an adjusting device.

While the servo motors 28 can be automatically controlled by the control device 76 on the basis of the load amounts detected by the load cells 51 as described above, the servo motors 28 may be controlled also in a manual mode. For example, where one of the four detected load amounts is smaller than the other three detected load amounts, it is possible to additionally rotate the corresponding one of the servo motors 28 (which corresponds to the load cell 51 detecting the smaller load amount, or which drives the ballscrew shaft 30 that is located radially inwardly of the load cell 51 detecting the smaller load amount) in the direction making the corresponding ballscrew nut 54 move toward the stationary plate 12, by successively transmitting a single pulse of a rotary command signal to the corresponding servo motor 28 so as to rotate the servo motor 28 in a predetermined amount with each transmission of the single pulse, while confirming change in the load amount detected by the load cell 51.

By controlling the rotations of the servo motors 28 on the basis of the load amounts detected by the load cells 51, the movable plate 14 is positioned to be parallel with respect to the stationary plate 12, and at the same time a required clamping force is applied evenly over the entirety of each of mutually opposed surfaces of the movable and stationary mold halves 22, 20 which are attached to the respective movable and stationary plates 14, 12.

In the mold clamping apparatus of the present embodiment of the invention, the ballscrew shafts 30 are directly connected to the rotors 60 of the respective servo motors 28 such that each ballscrew shaft 28 is rotatable together with the rotor 60 of the corresponding servo motor 28. This construction provides a smaller rotational inertia acting on the rotor 60 of each servo motor 28, than where the ballscrew nuts 54 are directly connected to the rotors 60 of the servo motors 28 as in a conventional apparatus, and accordingly reduces a load applied to each servo motor 28 upon initiation and termination of rotation of the servo motor 28, thereby shortening a time required for actual initiation or termination of the motion of the movable plate 14 in response to a command inputted by the operator for initiating or terminating the motion of the movable plate 14 during an operation for opening and closing the mold, resulting in a reduced time required for forming the product. Accordingly, the present mold clamping apparatus is advantageously used for forming a product required to be formed in a short time, such as a disk substrate to be used for an optical disk or magneto-optical disk, which is difficult to be formed by using a conventional mold clamping apparatus.

In the present mold clamping apparatus, the servo motors 28 are attached to the motor mounting plate 24 which is located to be opposed to the movable plate 14. That is, the servo motors 28 are located on the side of the movable plate 14 remote from the stationary plate 12, so that the servo motors 28 do not disturb an operation for taking out a purging resin from a nozzle of the injection molding machine (not shown) which is located on the side of the stationary plate 12 remote from the movable plate 14. The locations of the servo motors 28 prevent deterioration of the efficiency of such an operation which should be carried out on the side of the stationary plate 12 remote from the movable plate 14.

In the present mold clamping apparatus, each ballscrew shaft 30 extends from the stationary plate 12 toward the movable plate 14, and is supported at one of the axially opposite end portions by the stationary plate 12, so as to be not movable relative to the stationary plate 12 in the axial direction.

Thus, in contrast to a conventional apparatus, in which the ballscrew shafts are axially moved so as to move axially the movable plate so that the axial end portions of the respective ballscrew shafts project axially outwardly from the stationary plate, the ballscrew shafts 30 are not axially moved so as to axially move the movable plate 14, thereby not disturbing operations which are carried out on the side of the stationary plate 12 remote from the movable plate 14.

In the present mold clamping apparatus, each ballscrew shaft 30 is directly connected to be the rotor 60 of the corresponding servo motor 28, so as to be driven directly by the servo motor 28. The present mold clamping apparatus does not is have gears, belts or any other members for transmitting a rotational driving force generated by each servo motor 28, to the ballscrew shaft 30 or nut 54, it is possible to prevent generation of noises due to the mutually meshing gears and also production of dusts due to wear of the belts during operation of the apparatus, so that the present mold clamping apparatus can be used, for example, in an operation carried out in a clean room.

In the present mold clamping apparatus, the ballscrew shafts 30 and the rotors 60 of the respective servo motors 28 are directly connected to each other, by engagement of the plurality of grooves 58 formed in the outer circumferential surface of the axially distal end part 55 of each ballscrew shaft 30, with the plurality of the plurality of projections 66 formed in the inner circumferential surface of the circular hole 62 of each rotor 60. Thus, each ballscrew shaft 30 and the corresponding rotor 60 can be reliably connected to each other with an easy operation.

In the present mold clamping apparatus, the axially distal end part 55 of each ballscrew shaft 30 and the rotor 60 of the corresponding servo motor 28 are allowed to displaced relative to each other in the axial direction, while the ballscrew shaft 30 and the rotor 60 are connected to each other as described. This arrangement serves to prevent application of an excessively large load to the servo motors 28 even when the ballscrew shafts 30 are elongated by a force which is resistant to a mold clamping force and which is generated by and between the movable and stationary plates 14, 12 in an operation for closing the mold.

In the present mold clamping apparatus, an axial force, which is applied to each ballscrew shaft 30 during the operation for clamping the mold, acts on only an axial portion of the ballscrew shaft 30 which is located between the axial end portion supported by the stationary plate 12 and the intermediate portion engaging the ballscrew nut 54. Thus, the amount of the elongation of the ballscrew shaft 30 due to the generation of the clamping force is advantageously made smaller than where the axial force acts on an axial portion of the ballscrew shaft which is located between the axially opposite end portions respectively supported by the stationary plate and the motor mounting plate, i.e., on the almost entire length of the ballscrew shaft. The relatively small amount of the elongation of the ballscrew shaft 30 reduces the time required for actual initiation of the generation of the clamping force between the stationary and movable plates 20, 22 in response to the rotation of the ballscrew shaft 30 in the direction for clamping the mold, thereby resulting in a further reduced time required for forming the product.

In the present mold clamping apparatus, the ballscrew shaft protective covering member 52 is provided to disposed radially outwardly of the axially intermediate portion of each ballscrew shaft 30 which portion is located between the stationary and movable plate 12, 14, so as to protect the axially intermediate portion, particularly, the threaded part of the ballscrew shaft 30. For example, in an operation for mounting the mold halves 20, 22 onto the stationary and movable plates 12, 14, the covering member 52 prevents the thread from being damaged due to contact of the thread with the mold halves 20, 22. Further, the covering member 52 prevents splashing of oil, grease and other lubricants which are applied to the ballscrew shaft 30.

In the present mold clamping apparatus in which the rotary adjustment system is provided to adjust the rotary positions of the rotors 60 of the respective servo motors 28, for positioning the movable plate 14 relative to the stationary plate 12 with a high degree of parallelism of the movable plate 14 with respect to the stationary plate 12 when the mold is closed. Accordingly, the stationary and movable mold halves 20, 22 are constantly brought into contact in their mutually opposed surfaces with each other with a high degree of stability, whereby a desired product is reliably formed without a risk of forming a defective product. Further, owing to the rotary adjustment system, the present mold clamping apparatus is advantageously used for an injection molding operation carried out according to the so-called injection compression forming method, in which a molten resin is compressed with application of a predetermined amount of force after the molten resin has been injected into a mold cavity in the mold. The injection compression forming method, which can be practiced by using the present mold clamping apparatus, includes a step of injecting a molten resin into the mold cavity in the mold while the mold is not completely closed, and a step of completely closing the mold and then applying a compressive force to the molten resin while the mold is being clamped, or alternatively includes a step of injecting a molten resin into the mold cavity in the mold while the mold is being completely closed, a step of slightly open the mold, and a step of completely closing the mold and then applying a compressive force to the molten resin while the mold is being clamped.

In the present mold clamping apparatus, one of the upper pair of ballscrew shafts 30 consists of a right-hand ballscrew shaft, while the other consists of a left-hand ballscrew shaft. Similarly, one of the lower pair of ballscrew shafts 30 consists of a right-hand ballscrew shaft, while the other consists of a left-hand ballscrew shaft. According to this arrangement, when the ballscrew shafts 30 are twisted as a result of the rotations of the ballscrew nuts 54 relative to the ballscrew shafts 30, the right-hand ballscrew shaft and the left-hand ballscrew shaft are twisted in the respective directions opposite to each other, thereby preventing rotation of the movable plate 14 or displacement of the movable plate 14 in the circumferential direction relative to the stationary plate 12, due to the twisting deformations of the respective ballscrew shafts 30. Thus, this arrangement is effective to prevent undesirable offset of the movable mold half 22 relative to the stationary mold half 20 in the circumferential direction, assuring reliable positioning of the movable mold half 22 with respect to the stationary mold half 20 in a direction perpendicular to the axial direction of the ballscrew shafts 30.

In the present mold clamping apparatus, the amounts of the rotations of the respective ballscrew shafts 30 are controlled on the basis of the amounts of the loads detected by the respective load cells 52 which are fixed to the ballscrew nuts 54, such that a required clamping force is applied evenly to the entirety of each of mutually opposed surfaces of the movable and stationary mold halves 22, 20 which are attached to the respective movable and stationary plates 14, 12. The even distribution of the clamping force prevents or minimizes undesirable appearance of molding fin or flash in a parting line portion of the product which is formed in the cavity defined by and between the movable and stationary mold halves 22, 20. The mold opening motion is carried out with the parallel relationship between the movable and stationary plates 14, 12 being well maintained, avoiding a risk of formation of scratch on the mutually opposed surfaces of the respective movable and stationary mold halves 22, 20, thereby preventing the mold halves 22, 20 and the formed product from being damaged or broken during the mold opening motion.

While the presently preferred embodiment of this invention has been described in detail, for illustrative purpose only, it is to be understood that the present invention is not limited to the details of the illustrated embodiment, but may be otherwise embodied.

For example, in the above-illustrated embodiment, the four ballscrew shafts 30 are employed in place of tie bars for guiding the movable plate during its motions toward and away from the stationary plate 12. However, such tie bars may be provided in the apparatus of the invention, in addition to the ballscrew shafts 30.

While the number of the ballscrew shafts 30 is four in the above-illustrated embodiment, the number of the ballscrew shafts 30 may be suitably changed to any number not smaller than two, depending upon the sizes and shapes of the stationary and movable plates 12, 14. It is to be understood that the number of the ballscrew nuts 54 engaging the ballscrew shafts 30 and the number of the servo motors 28 connected to the ballscrew shafts 30 are determined according to the number of the ballscrew shafts 30.

The construction for supporting the ballscrew shafts 30 is not limited to the details of the above-illustrated embodiment, and may be suitably modified as long as each ballscrew shaft 30 is supported at its axial end portion by the stationary plate 12 such that the ballscrew shaft 30 is rotatable in the forward and reverse direction about the axis and is not movable relative to the stationary plate 12 in the axial direction.

In the above-illustrated embodiment, the spline grooves 58 and the spline projections 66 are formed in the axially distal end part 55 of the ballscrew shaft 30 and the round hole 62 of the rotor 60, respectively, for connecting each ballscrew shaft 30 directly with the rotor 60 of the corresponding servo motor 28 rotatably together with each other. However, the spline grooves 58 and the spline projections 66 may be replaced by a keyway and a key, which is fitted into the keyway with engagement thereof with the keyway in the circumferential direction of the ballscrew shaft 30. Further, the ballscrew shaft 30 and rotor 60 of the servo motor 28 may be bonded to each other. In this case, it is preferable that at least one of the stationary plate 12 and the motor mounting plate 24 is adapted to be displaceable in the axial direction of the ballscrew shaft 30, for permitting axial displacement of the ballscrew shaft 30 as a result of elongation of the ballscrew shaft 30 due to a force resistant to the mold clamping force, thereby preventing application of an excessively large load to the servo motor 28.

While the ballscrew shaft protective covering member 52 used for covering the axially intermediate portion of each ballscrew shaft 30 is of a telescopic type in the above-illustrated embodiment, the covering member may be of an accordion type or other expandable type. It is to be understood that such a covering member is not essential.

While the servo motors 28 are controlled by the control device 76 such that the detected rotary positions of the rotors 60 of the respective servo motors 28 coincide with the target rotary positions of the rotors 60 of the respective servo motors 28 in the process of adjusting the rotations of the servo motors 28 with the rotary adjustment system in the above-illustrated embodiment, the servo motors 28 may be synchronously controlled by the control device 76 such that the detected rotary positions of the rotors 60 of the respective servo motors 28 coincide with each other.

While the illustrated embodiment of the invention is a mold clamping apparatus which is to be incorporated in an injection molding machine and which is of a horizontal-type wherein the movable plate 14 is opposed to the stationary plate 12 in the horizontal direction so as to be movable toward and away from the stationary plate 14 in the horizontal direction, it is to be understood that the principal of the invention is equally applicable to a vertical-type mold clamping apparatus wherein the movable plate 14 is opposed to the stationary plate 12 in the vertical direction so as to be movable toward and away from the stationary plate 14 in the vertical direction, and various other types of mold clamping apparatuses such as those to be incorporated in press forming machines or other forming machines.

It is to be understood that the present invention may be embodied with various other changes, modifications and improvements, such as those described in the SUMMARY OF THE INVENTION, which may occur to those skilled in the art, without departing from the spirit and scope of the invention defined in the following claims.

What is claimed is:

1. A mold clamping apparatus for clamping a mold consisting of a stationary mold half and a movable mold half, said mold clamping apparatus comprising: a stationary plate to which said stationary mold half is to be fixed; a movable plate to which said movable mold half is to be fixed and which is disposed so as to be opposed to said stationary plate in a predetermined direction; and a moving device which moves said movable plate toward and away from said stationary plate in said predetermined direction, so as to close and open said mold, wherein said moving device comprises:

a plurality of ballscrew shafts each of which extends in said predetermined direction from said stationary plate toward said movable plate, and each of which is supported at one of axially opposite end portions thereof by said stationary plate, so as to be rotatable relative to said stationary plate and so as not to be displaceable relative to said stationary plate in an axial direction thereof;

a plurality of servo motors which drive the respective ballscrew shafts, and which are disposed on one of opposite sides of said movable plate remote from said stationary plate, each of said servo motors having a rotor which is connected to the other of said axially opposite end portions of the corresponding one of said ballscrew shafts such that said rotor and the corresponding ballscrew shaft are rotatable together; and a plurality of ballscrew nuts which engage the respective ballscrew shafts and are fixed to said movable plate, so as to be moved in said axial direction by rotations of said respective ballscrew shafts, for thereby moving said movable plate toward and away from said stationary plate in said axial direction.

2. A mold clamping apparatus according to claim 1, wherein said rotor has, at a center thereof, an axial hole in which said other of said axially opposite end portions of said ballscrew shaft is received, and wherein said rotor has an internal spline, and said ballscrew shaft has, in said other of said axially opposite end portions, an external spline which engages said internal spline of said rotor for enabling said ballscrew shaft to rotate together with said rotor and permitting a sliding movement of said ballscrew shaft relative to said rotor in said axial direction.

3. A mold clamping apparatus according to claim 2, wherein said internal spline consists of a plurality of projections or grooves formed in an inner circumferential surface of said axial hole of said rotor and circumferentially spaced apart from each other, and said external spline consists of a plurality of grooves or projections formed in an outer circumferential surface of said other of said axially opposite end portions of said ballscrew shaft and circumferentially spaced apart from each other, and wherein said axial hole has a bottom face which cooperates with an axial end face of said other of said axially opposite end portions of said ballscrew shaft to define an axial spacing for permitting displacement of said ballscrew shaft relative to said rotor in said axial direction while said internal spline and said external spline are held in engagement with each other.

4. A mold clamping apparatus according to claim 1, further comprising a tubular covering member which is disposed between said stationary plate and said movable plate and which surrounds at least a threaded part of each of said ballscrew shafts.

5. A mold clamping apparatus according to claim 1, further comprising an actual-rotary-position detecting device which detects an actual rotary position of said rotor of each of said servo motors, a target-rotary-position setting device which sets a target rotary position of said rotor of each of said servo motors which makes said movable plate parallel to said stationary plate, and a control device which controls said servo motors such that the detected rotary position of said rotor of each of said servo motors coincides with the set target rotary position of said rotor of each of said servo motors.

6. A mold clamping apparatus according to claim 5, wherein said actual-rotary-position detecting device includes a rotary encoder which is built in each of said servo motors.

7. A mold clamping apparatus according to claim 1, wherein at least one of said ballscrew shafts consists of a right-hand ballscrew shaft, while each of the other of said ballscrew shafts consists of a left-hand ballscrew shaft.

8. A mold clamping apparatus according to claim 7, wherein said ballscrew shafts consists of an even number of ballscrew shafts consisting of at least one pair of ballscrew shafts each of which consists of the right-hand ballscrew shaft and the left-hand ballscrew shaft.

9. A mold clamping apparatus according to claim 1, further comprising a guide way which extends in said predetermined direction and which supports said movable plate such that said movable plate is sidable on said guide way in said predetermined direction.

10. A mold clamping apparatus according to claim 1, further comprising a load detecting device which detects amounts of loads acting between the respective ballscrew nuts and said movable plate when the mold is being clamped after the stationary and movable mold halves have been brought into contact with each other by the rotations of said respective ballscrew shafts, and an adjusting device which adjusts amounts of the rotations of said respective ballscrew shafts such that said amounts of the loads detected by said load detecting device are equal to each other.

11. A mold clamping apparatus according to claim 10, wherein said load detecting device includes a plurality of load cells which are interposed between said respective ballscrew nuts and said movable plate and which detect the amounts of loads acting between said respective ballscrew nuts and said movable plate.

* * * * *